March 8, 1960 K. R. LEWIS 2,927,390

SINGLE AND DOUBLE ACTION REVOLVER FIRING MECHANISM

Filed Jan. 31, 1955 4 Sheets-Sheet 1

INVENTOR.
KARL R. LEWIS
BY
Salvatore G. Militana
ATTORNEY

March 8, 1960 K. R. LEWIS 2,927,390

SINGLE AND DOUBLE ACTION REVOLVER FIRING MECHANISM

Filed Jan. 31, 1955 4 Sheets-Sheet 2

INVENTOR.
KARL R. LEWIS
BY
Salvatore G. Militana,
ATTORNEY

March 8, 1960 K. R. LEWIS 2,927,390

SINGLE AND DOUBLE ACTION REVOLVER FIRING MECHANISM

Filed Jan. 31, 1955 4 Sheets-Sheet 3

*INVENTOR.*
KARL R. LEWIS
*BY*
Salvatore G. Militana
ATTORNEY

March 8, 1960 K. R. LEWIS 2,927,390

SINGLE AND DOUBLE ACTION REVOLVER FIRING MECHANISM

Filed Jan. 31, 1955 4 Sheets-Sheet 4

*INVENTOR.*
KARL R. LEWIS
*BY*
Salvatore G. Militana
ATTORNEY 2,927,390

SINGLE AND DOUBLE ACTION REVOLVER FIRING MECHANISM

Karl R. Lewis, Miami, Fla.

Application January 31, 1955, Serial No. 484,999

9 Claims. (Cl. 42—65)

This invention relates generally to small arms and is more particularly directed to a revolver type firm arm capable of being fired by either single or double action.

A principal object of the present invention is to provide a revolver which is a single and double action fire arm having an enclosed hammer and hammer mechanism and a relatively fixed position for the trigger for firing the gun by either single or double action.

A further object of the present invention is a revolver having an adjustable trigger bar and trigger return spring which permits one to adjust the grip and force respectively of trigger pull as desired.

A further object of the present invention is to provide a revolver with an adjustable sear for a wide range of trigger settings.

A further object of the present invention is to provide a revolver with a tapered cylinder stop for eliminating any lateral play in the cylinder and automatically adjusting itself for any wear.

A still further object of the present invention is the provision of a revolver described as above with a cocking lever normally used as a thumb rest and which is actuated by a downward movement on one's thumb as the gun is held in shooting position.

A still further object of the present invention is to provide a cylinder of a revolver with an ejector spring which yieldingly forces the cylinder to the rear adjusting the head space of a cartridge to hold the shell in firing position firmly against the frame of the gun and thereby prevent misfires.

A still further object of the present invention is the provision of a revolver characterized as above and provided with a plurality of safety features.

The invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

Figure 19:
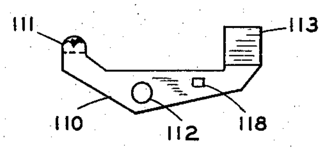
Figure 20:
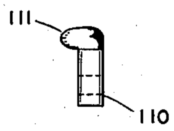
Figure 21:
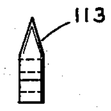

Figures 19–21 inclusive are side, front and rear elevational views of a cylinder stop.

Figure 22:
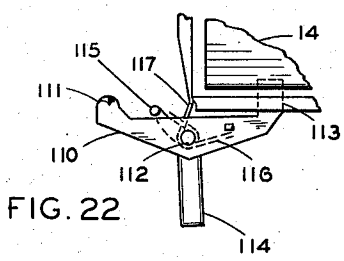

Figure 22 is a detail elevational view of the combined cylinder stop and rebound lever with the cylinder shown only in part and the actuating spring shown in place.

Figure 24:
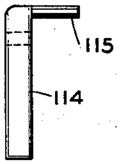
Figure 23:
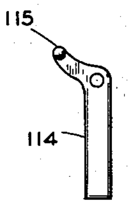

Figures 23 and 24 are elevational front and side views of the rebound lever shown removed from the revolver.

Figure 25:
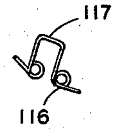

Figure 25 is a detail view of a rebound lever and cylinder stop actuating spring.

Figure 26:
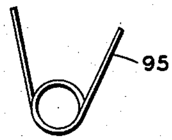

Figure 26 is a detail view of a hammer set spring.

Figure 27:
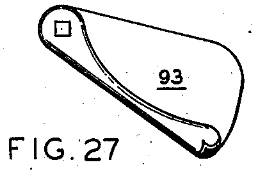

Figure 27 is a side elevational view of a cocking lever.

Figure 28:
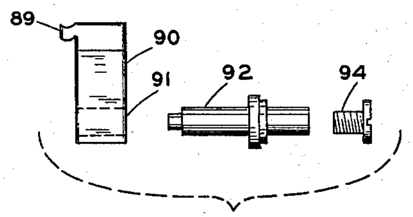

Figure 28 is an exploded view of a hammer set assembly.

Figure 29:
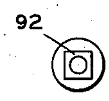
Figure 30:
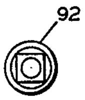

Figures 29 and 30 are end views of the hammer set.

Figures 8, 9, 10, 11, 12, 13, 14, 15:
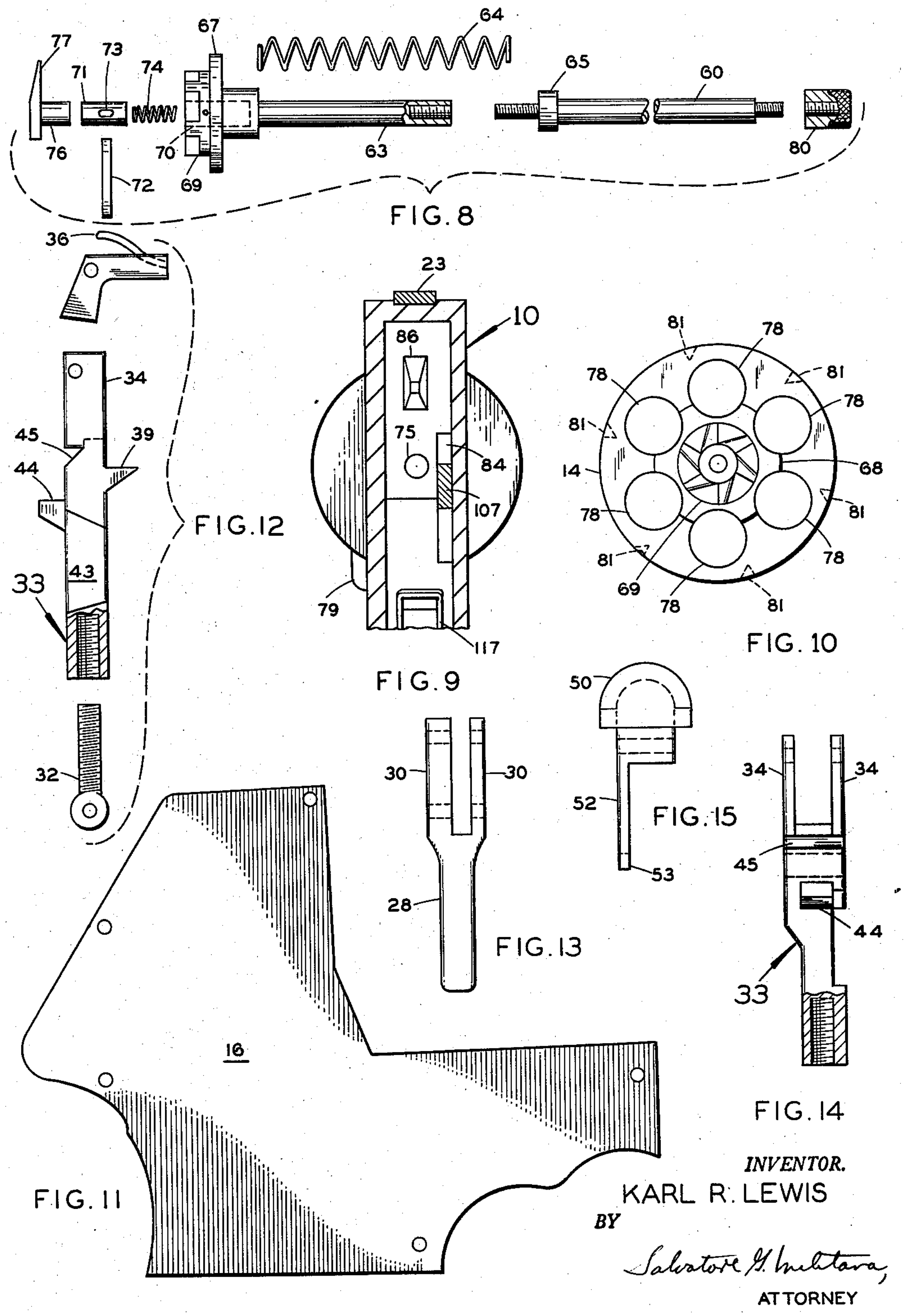
Figure 8 is an exploded view of the ejector mechanism.
Figure 9 is a fragmentary sectional view taken along the line 9—9 of Figure 2.
Figure 10 is a rear elevational view of the cylinder.
Figure 11 is an elevational view of a side plate.
Figure 12 is an exploded view of the hammer actuating machanism.
Figure 13 is a front elevational view of the trigger as shown removed from the revolver.
Figure 14 is a top plan view of the trigger bar.
Figure 15 is a top plan view of the grip safety.
Figure 16:
Figure 16 is a side view of sear spring.
Figure 17:
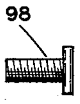
Figures 17 and 18 are side and end views of an adjustable sear.
Figure 18:
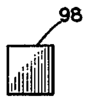

Referring now to the drawings wherein like numerals are used to designate similar parts throughout the several views, the numeral 10 refers to a frame of a revolver-type gun having a threaded bore 11 for receiving a barrel 12 communicating with an opening 13 in which is housed a cylinder 14. Chamber 15 which is enclosed by a side plate 16 contains the firing mechanism of the gun 10 while chamber 17 which is contained in a pistol grip 18 is enclosed by a floor plate 19 pivoted as at 20 and secured in its closed position by a spring loaded latch 21. The chamber 17 is intended to contain extra bullets. The frame 10 is provided with a conventional trigger guard 22 and a rear sight 23 and front sights 24 mounted on the gun frame 10 and barrel 12 respectively. A trigger 28 extending to adjacent the trigger guard 22 is pivotally mounted to the frame 10 by a pin 29 and has a bifurcated arm portion 30 housed in the chamber 15. The arm portion 30 is pivotally secured as at 31 to a threaded connector 32 secured at the end portion of a trigger bar 33 which extends to the rear portion of the chamber 15 and terminates in a bifurcated portion 34 adjacent a rear wall 35 of the chamber 15 (see Figures 2, 12 and 14). One end of a sear spring 36 engages the rear wall 35 while its other end is secured to a sear 37 pivotally mounted by a pin 38 to the bicurcated end portion 34 of the trigger bar 33. On the bottom wall of the trigger bar there extends downwardly a shoulder 39 which engages a combined support and stop member 40 secured to the side wall of the frame 10 for limiting the rearward sliding movement of the trigger bar 33. A slot 43 having diverging end walls is formed in the side wall of the trigger bar 33 while the upper wall of the trigger bar 33 is provided with an upwardly extending shoulder 44 and a transversely disposed recess 45 whose functions are explained in detail hereinafter. The trigger bar 33 is yieldingly urged to the rear of the chamber 15 by a trigger return spring 46 mounted on the pin 29 and having leg portions engaging the connector 32 and an adjustment screw 47 threaded in a bore 48 formed in the frame 10 above the trigger guard 22. By adjusting the position of the adjustment screw 47, the force required to pull the trigger 28 is varied provided the connector 32 is maintained fixed. If the latter is likewise adjusted to vary the length of the grip, then the force required to pull the trigger 28 may be maintained constant by a proper adjustment of the adjustment screw 47.

Safety means are provided to prevent the pulling of the trigger 28 under certain conditions comprising a grip safety 50 positioned along the grip 18 and pivotally mounted to the frame 10 by a pin 51 and an arm portion 52 extending into the chamber 15 and terminating in a dog 53 engageable with the recess 45 of the trigger bar 33. A spring 54 is mounted between the grip 18 and grip safety 50 yieldingly urging the safety 50 to be normally spaced from the grip 18 and the arm 52 to swing in a direction of the trigger bar 33 thereby compelling the dog 53 to be received by the recess 45 to lock the trigger bar 33. At no time can the trigger 28 be actuated unless the safety grip 50 has been pressed or forced in the direction of the grip 18 such as in the gripping the gun handle 18 to fire the revolver 10 and causing the dog 53 to swing upwardly out of the recess 45 and thereby free the trigger bar 33 for sliding movement when the trigger 28 is actuated.

Figures 1, 4, 5, 6:
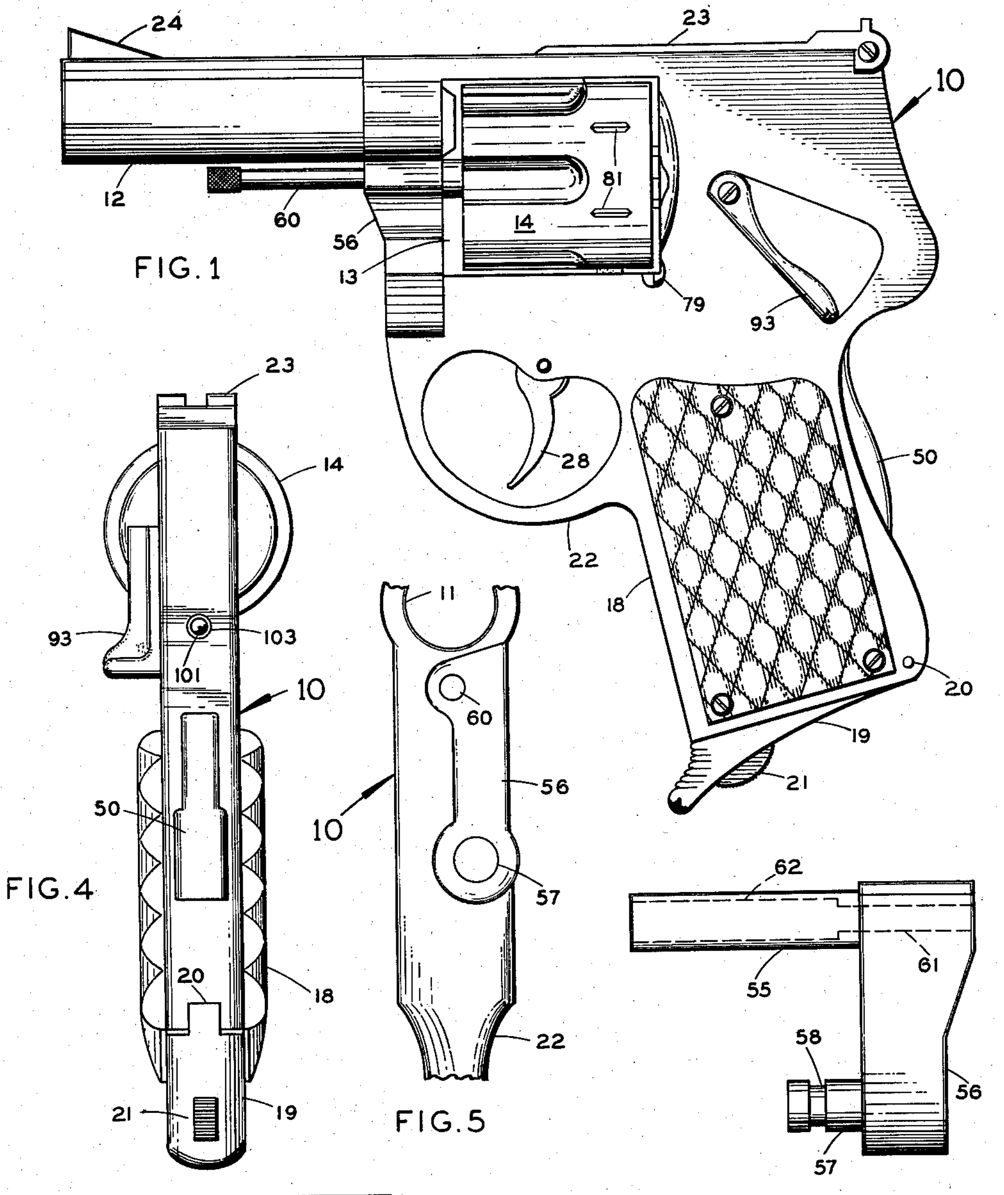
Figure 1 is a side elevational view of a revolver embodying my invention.
Figure 4 is a rear elevational view of the revolver.
Figure 5 is a fragmentary front elevational view of the revolver frame shown with the barrel and cylinder removed.
Figure 6 is a side elevational view of the crane as seen removed from the revolver.
Figure 7:
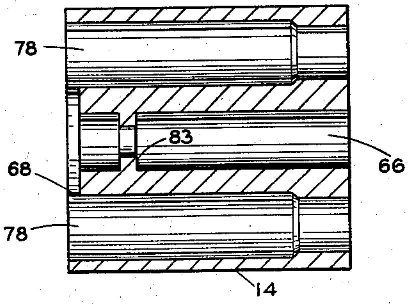
Figure 7 is a cross sectional view of the cylinder.
Figures 2, 3:
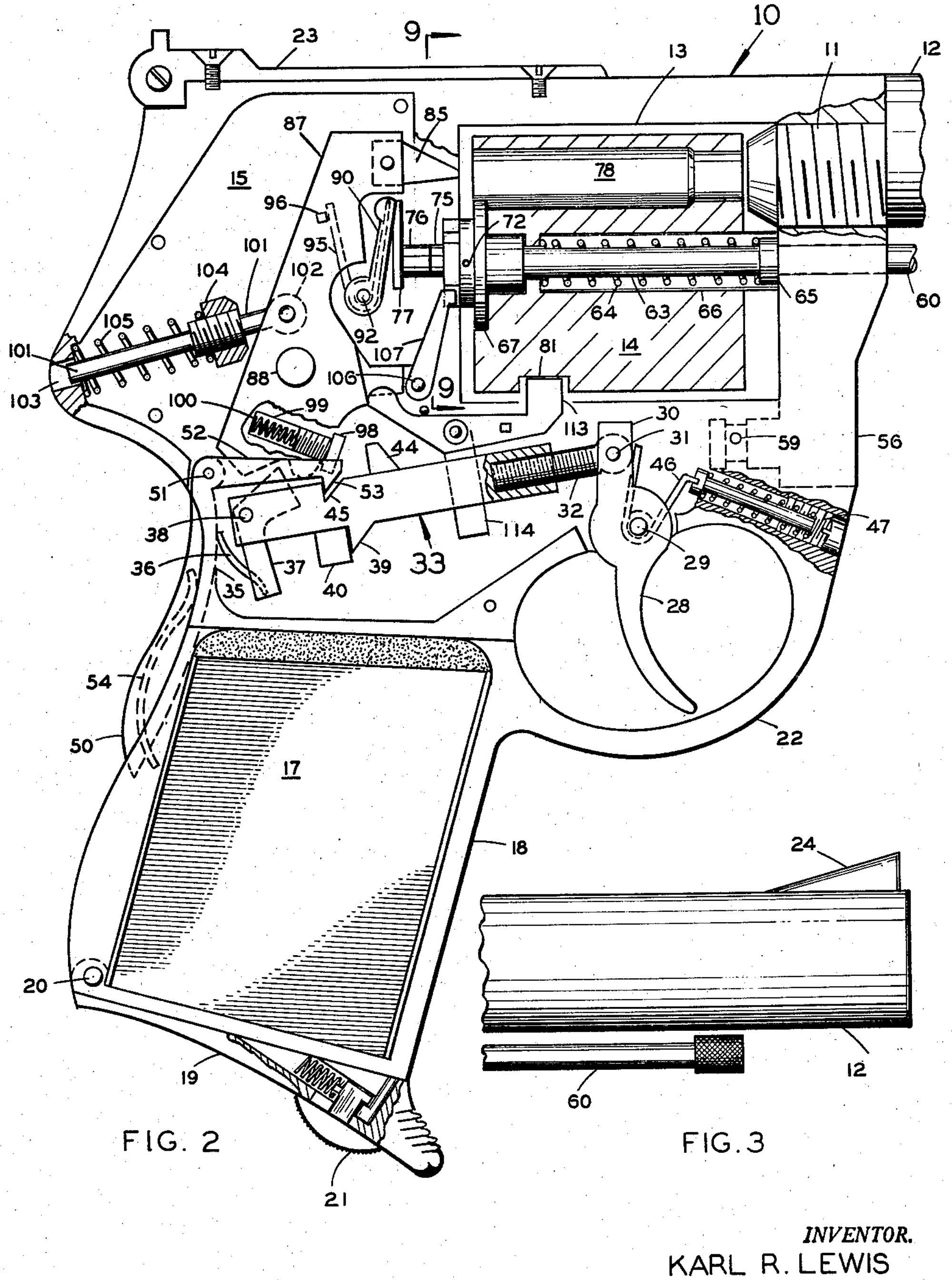
Figure 2 is a side elevational view, taken from the side opposite to that shown in Figure 1, with the side plate removed.
Figure 3 is a continuation of Figure 2 showing the barrel and ejector rod.

As in all conventional revolvers, the cylinder 14 is so mounted in the frame opening 13 so as to swing outwardly for ejecting and reloading bullets therein. The cylinder 14 is revolvably mounted on a hollow shaft 55 secured at one end to a crane 56 whose lower end is pivotally mounted to the forward portion of the frame 10 by a shaft 57. The shaft 57 is provided with a slot 58 which receives a pin 59 mounted on the gun frame 10 for securing the crane 56 on the frame 10. An ejector rod extension 60 is slidably mounted in a bore 61 in the crane 56, and extends into a bore 62 in the hollow shaft 55 where it is threaded onto the end of an ejector rod 63. An ejector spring 64 is mounted on the ejector rod 63 extending between a shoulder 65 on the ejector rod extension 60 and an annular shoulder 83 in the centrally disposed bore 66 thereby urging an ejector plate 67 in its seated position in an annular slot 68 formed on the inner face of the cylinder 14. On the extreme end of the ejector rod 63 is mounted a ratchet wheel 69 with a bore 70 disposed at the center portion to receive a cylinder bolt 71 secured therein for limited movement by a pin 72 secured to the ratchet wheel 69 and extending through an elongated bore 73 in the cylinder bolt 71. A spring 74 is mounted in the bore 70 abutting against the inner end of the cylinder bolt 71 thereby urging the latter to its extended position with one end of the cylinder bolt 71 positioned beyond the face of the ratchet wheel 69 and into a bore 75 in the gun frame 10. A cylinder release member 76 is slidably mounted in the bore 75 and having a cap portion 77 mounted in the chamber 15 normally in spaced relation with the front wall of the chamber 15. The cylinder release member 76 is actuable by a hammer set member 90 which is normally in contact relation with the cap portion 77. The hammer set 90 is provided with a bore 91 about which the hammer set 90 pivots, the bore 91 having a square cross-section through which a cocking bar 92 of similar cross-section extends. The cocking bar 92 is pivotally mounted on and extending through the side wall of the gun frame 10 with a cocking lever 93 secured on the outside of the gun 10 to the end of the cocking bar 92 by a lock bolt 94. A hammer set spring 95 is mounted on the cocking bar 92 with one leg portion abutting against a stop 96 mounted in the chamber 15 and secured to the inner surface of the side wall thereof and the other leg portion on a hammer set arm 89 mounted on the hammer set 90. By exerting an upward pressure on the cocking lever 93, the cocking bar 92 and the hammer set 90 will rotate in a clockwise direction as seen in Figure 2, causing the cylinder release 76 to slide in a forward direction. By sliding the cylinder release 76 forwardly, the cylinder bolt 71 is made to slide forwardly against spring pressure 74 until the bolt 71 moves out of the bore 75 of the frame 10 permitting the cylinder 14 to swing out of the cylinder opening 13 on the crane 56 to a position whereby cartridges in cartridge chambers 78 are clear of the frame 10. A cylinder catch 79 secured to the side of the gun frame 10 is provided with a lip which engages the cylinder 14 in its opened or unhoused position to prevent the cylinder 14 from sliding rearwardly off the shaft 55. With the cylinder 14 in its opened position, a rearward thrust on ejector rod head 80 causes the ejector rod 63 to slide to the rear carrying the ejector plate 67 which engages the cap of the bullets in the cartridge chambers 78 to eject them therefrom. When the cylinder 14 is in its housed position, it is free of the cylinder catch 79 and the cylinder 14 is forced to the rear into contact relation with the cap of a cartridge which in turn is in contact relation with the outer wall of the gun frame 10. This places the cartridge in its proper firing position, notwithstanding the thickness of the cartridge cap, to be fired by a firing pin 85 which extends through a firing pin bore 86 in the forward wall of the gun frame 10 and is mounted on the upper end portion of a hammer 87.

The hammer 87 is pivotally mounted to the side wall of the frame 10 by the pin 88 and has at its lower end portion a double action sear notch 97 and an adjustable screw or pin 98 threaded into a bore 99 formed in the hammer 87. A spring 100 mounted in the bore 99 exerts an outward pressure on the adjustment screw 98 and thereby prevents the inadvertent displacement of the adjustment screw 98.

At the rear of the hammer 87 there is pivotally secured as at 102 a main spring guide 101 whose other end extends to a bore 103 in the rear of the gun frame 10. The guide 101 is threaded at approximately its midportion to receive an adjustable nut 104 thereon against which a main spring 105 abuts at one end while the other end engages the inside surface of the rear wall of chamber 15 exerting a force against the hammer 87. When the hammer 87 is pivoted to its cocked position, it is cocked against the spring pressure 105 and the free end of the main spring guide 101 will slide through the bore 103 and become visible from the outside of the gun 10.

At the forward lower portion of the hammer 87 there is an arm portion 106 extending outwardly therefrom on which there is pivotally mounted a pawl 107 whose other end extends through an opening 84 in the gunframe 10 and is in engagement with the ratchet 69 for rotating the cylinder 14. The hammer arm 106 is provided with a recess 108 along the side wall thereof extending adjacent the bottom edge where the side wall is unslotted to form a lip or ledge 109. The recess 108 is engaged by a boss or projection 111 of a cylinder stop 110 which is pivotally mounted to the frame 10 as at 112 with its other end 113 terminating in a wedge shape extending outwardly of the chamber 15 and into one of the notches 81 on the cylinder 14. Also pivotally mounted on the pivot pin 112 is a rebound lever 114 at whose upper end a finger 115 extends at approximately right angle to the cylinder stop 110. The lower end of the rebound lever 114 lies adjacent the trigger bar 33 in the slot 43. A double action spring 116 is mounted on the pivot pin 112 with a body portion 117 abutting against the frame 10 while one arm portion is engaged by a stop 118 mounted on the cylinder stop 110 and the other arm portion engages the rebound lever 114.

*Single action*

In order to fire the revolver 10 by single action, the grip 18 is grasped in the usual manner causing the grip safety 50 to swing in the direction of the grip 18 pivoting on the pivot pin 51 and causing the grip safety arm 52 to swing upwardly raising the dog 53 out of the notch 45. Now a downward pressure is exerted by the thumb on the cocking lever 93. This causes the cocking bar 92 and the hammer set 90 to rotate in a counter-clockwise direction, as viewed in Figure 2 the hammer set 90 impinging on the edge of the hammer 87. Continued pressure on the cocking lever 93 will cause the hammer 87 to pivot on the pivot pin 88 from its neutral or uncocked position against the main spring pressure 105, meanwhile the hammer arm 106 swings upwardly causing the cylinder stop 110 to pivot about its pivot pin 112 in a clockwise direction by virtue of the ledge 109 of the hammer arm 106 engaging the boss 111 of the cylinder stop 110. The stop 113 swings out of the notch 81 of the cylinder 14 as the pawl 107 being carried in an upward direction by the swinging hammer arm 106 and in contact engagement with the ratchet 69 causes the cylinder 14 to revolve to bring an adjacent cartridge chamber 78 and a fresh cartridge in line with the firing pin 85 and the barrel 12. As the pawl 107 begins to reach its topmost position, the boss 111 of the cylinder stop 110 slips past the ledge 109 of the hammer arm 106 and the spring 116 then compels the stop 113 to swing upwardly into the notch 81 thereby locking the cylinder 14 against further rotation. At the same time, the adjustment pin 98 has lodged itself on top of the shoulder 44 of the trigger bar 33. The main spring guide 101 is now exposed at the rear of the gun 10 indicating that it is in its cocked position. The thumb pressure on the cocking lever 93 is now released and the spring 95 causes the hammer set 90 to swing in a clockwise direction to its former position to rest on the cylinder release cap 77. Since the cylinder bolt spring 74 exerts a greater pressure than the hammer set spring 95, the cylinder release 76 and the cylinder bolt 71 are maintained in position and the cylinder revolvably locked in the opening 13 of the gun 10. The revolver 10 is now cocked and ready to be fired by pressing on the trigger 28 against the trigger return spring 46. As the trigger 28 swings to the rear, the amount of force required and the distance of the swing being determined by the position of the adjustment screw 98, connector 32 and spring 46 respectively, the trigger bar 33 slides forwardly until the pin 98 slips from its position behind the shoulder 44 and the main spring 105 takes over and compels the hammer 87 to pivot in a clockwise direction until the firing pin 85 strikes the cartridge to fire the gun and the hammer 87 is returned to its neutral or uncocked position as shown by Figure 2.

After the gun 10 has been fired, the trigger 28 is released and the trigger return spring 46 forces the trigger bar 33 to slide to the rear of the chamber 15. The rebound lever 114 which is made to pivot on the pivot pin 112 by the lower end of the lever 114 being abutted by the rear edge of the slot 43 of the trigger bar 33 strikes against the hammer arm 106 causing the hammer 87 to swing to the rear a slight distance. This retracts the firing pin 85 so that it does not extend beyond the forward end of the firing pin bore 86. As the trigger bar 33 moves to its extreme rearward position, the disconnector spring 36 bears against the rear wall 35 of the chamber 15 causing the sear 37 to pivot on its pivot pin 38 and swing to its normal position behind the hammer double action sear 97. The shoulder 39 of the trigger bar 33 now abuts against the stop 40 bringing the trigger bar 33 to rest. The gun 10 is now ready to be cocked and fired again as described hereinabove. Upon release of the grip 18, the spring 54 will cause the grip safety 50 to swing away from the grip 18 and the safety arm 52 will swing downwardly with the dog 53 becoming lodged in the notch 45 to lock the trigger 28 against manipulation. Also, the main spring guide 101 will be out of view having slid inwardly in the bore 103 indicating that the gun 10 is not cocked.

*Double action*

When firing the gun 10 by double action, the grip 18 is grasped and the grip safety 54 is caused to be pivoted permitting the dog 53 to swing upwardly out of the notch 45 of the trigger bar 33 thereby freeing the latter. Pressure exerted on the trigger 28 will draw the trigger bar 33 forwardly releasing the rebound lever 114 and carrying the sear 37 forwardly into abutting relation with the double action sear notch 97 to swing the hammer 87 to the rear. The force being applied on the trigger 28 overcomes the main spring pressure 105 and compels the hammer 87 to retract or pivot on the pin 88 to the rear. The swinging movement of the hammer arm 106 operates the cylinder stop 110 and the pawl 107 as described above in the explanation of single action firing to revolve the cylinder 14 and bring a fresh cartridge in a previously adjacent cartridge chamber 78 into firing position. As the pawl 107 reaches its topmost position, the cylinder stop 110 has swung back to its locked position with the stop 113 moving into the notch 81 to lock the cylinder 14 in position, and the sear 37 engaging the stop 40 to pivot the sear in a clockwise direction until it becomes disengaged from the sear notch 97 of the hammer 87. The main spring 105 now forces the hammer 87 to swing toward the forward end of the chamber 15 with such force that the firing pin 85 strikes the cartridge to fire same. The trigger 28 is then released; the trigger return spring 46 forces the trigger bar 33 rearwardly and the trigger 28 returns to its normal position. As the trigger bar 33 slides to the rear of the gun, the rebound lever 114 impinges on the hammer arm 106 as explained above causing the hammer 87 to retract from its extreme firing position for a short distance inwardly so that the firing pin 85 does not extend beyond the forward edge of the opening 86. Meanwhile the sear 37 has ridden under the fixed sear notch 97 and is caused to snap back to its normal position (as shown by Figure 2) upon the sear spring 36 engaging the end wall 35 of the gun frame 10. The trigger bar 33 comes to rest with the shoulder 39 engaging the stop 40. The gun mechanism is now ready to repeat the double action firing cycle provided pressure is maintained on the grip safety 50.

After the cartridges have been fired they are removed from the cylinder 14 and replaced by fresh shells by pressing upwardly on the cocking lever 93 with one's thumb. This causes the hammer set 90 to swing forwardly against the cylinder release cap 77 which forces the cylinder release 76 to slide forwardly to push the cylinder bolt 71 out of the bore 75 in the frame 10 and into the bore 70 of the ratchet plate 69. The cylinder 14 can now be swung outwardly of the frame 10 by swinging the crane 56 away from the gun 10. The cocking lever 93 is now released. By pushing rearwardly on the ejector rod 60, the latter is slid in the direction of the cylinder 14, carrying the ejector plate 67 which forces the cartridge out of the cartridge chamber 78 to thereby eject them. Upon releasing the ejector rod 60, the spring 64 returns the ejector rod 60 to its normal position. Fresh cartridges are now placed in the cartridge chambers 78 and the cylinder 14 is swung on the crane 56 back into the cylinder opening 13 where the spring 74 will return the cylinder bolt 71 into the bore 75 in the gun frame 10 to lock the cylinder 14 in position.

If it is desired to change the position of the trigger 28 that is, change the distance between the grip safety 50 and the trigger 28 to accommodate the user of the gun 10, the trigger bar connector 32 may be threaded in or out on the connector bar 33. Now, the trigger return spring 46 may be adjusted by the adjustment screw 47 to provide the trigger 28 with the same amount of pull as existed prior to adjustment of the trigger 28. However, the trigger pull poundage may be varied as desired by the adjustment of the adjustment screw 47. Whether the revolver 10 is fired by single or double action the position of the trigger 28 remains in the same relative position in the trigger guard 22.

The arrangement of the enclosed mechanism in the chamber 15 of the gun 10 provides a concealed hammer 86, a better balanced gun than the conventional revolver and a longer sighting radius from the front sight 24 to the rear sight 23. Also, a chamber 17 in the grip stock 18 provides a storage space for extra cartridges. The adjustable pin 98 which is utilized in single action firing may be adjusted from a hair trigger setting to a longer trigger pull as required by military standards. The cylinder stop 110 has a tapered stop 113, wedge-shaped in cross section which engages a similar shaped notch 81 in the cylinder 14 to lock same in position for firing. Any lateral motion of the cylinder 14 prevalent in conventional revolvers that is caused by wear of the stop 113 is avoided and an accurate alignment of the firing pin 85 and the cartridge chamber 78 containing the cartridge to be fired is always assured in the revolver 10. The ejector spring 64 yieldingly urges the cylinder 14 to the rear so that the head of the cartridge to be fired is in contact relation with the frame 10 at the firing pin bore 86 and the cylinder 14 to assure a proper head spacing for cartridges to be fired at all times. The main spring 105 which controls the amount of force imparted by the firing pin 85 may be readily adjusted by the nut 104 to increase or decrease the hammer pull poundage. Also, due to the arrangement of the main spring guide 101, the stock casing 18 at its upper rear portion is provided with a protrusion which normally rests on the user's hand thereby preventing the tendency of the revolver to slip downwardly in a person's grip as occurs in the conventional revolver.

What I claim as new is:

1. A device of the class described comprising a frame, said frame having a chamber and an end wall with a bore extending through said end wall of said frame to said chamber, a hammer pivotally mounted in said chamber, a guide rod pivotally secured to said hammer at one end and the other end confined within said bore when said hammer is in neutral position and extending through said bore beyond said end wall when said hammer is in a cocked position thereby indicating the position of said hammer, a nut threadedly mounted on said guide rod and a spring mounted on said guide rod and extending between said frame and said adjustable nut exerting a force on said hammer when in a cocked position.

2. In a firearm having a frame, a support in said frame, a trigger bar slidably mounted on said support, an adjustable connector secured at one end to said trigger bar, a trigger pivotally secured to the other end of said connector, a spring mounted on said trigger urging said trigger bar in one direction and a shoulder mounted on said trigger bar in alignment with said support whereby upon movement of said trigger bar said shoulder will engage said support limiting the movement of said trigger bar in said one direction.

3. The structure as recited by claim 2 and a grip safety means pivotally mounted on said frame, said grip safety means having an arm portion extending adjacent said trigger bar, a shoulder mounted on said arm portion, said trigger bar having a recess and spring means mounted on said grip safety urging said shoulder into engagement with said recess whereby said trigger becomes locked.

4. In a firearm having a frame, a support in said frame, a trigger bar slidably mounted on said support, an adjustable connector secured at one end to said trigger bar, a trigger having an arm portion, pivot means pivotally mounting said trigger to said frame, means securing said arm portion to said other end of said adjustable connector, a spring mounted on said trigger and adjustable means operatively connected to said spring for varying the force required to operate said trigger.

5. A firearm comprising a frame having an end wall, a hammer pivotally mounted on said frame, a spring yieldingly urging said hammer to its neutral position, said hammer having a sear notch, a stop member secured to said frame, a trigger bar slidably mounted in said frame adjacent said stop member, a sear pivotally mounted intermediate its ends on said trigger bar in proximity of said end wall, said sear having leg portions, one of said leg portions in proximity of said sear notch, a sear spring mounted on the other of said leg portions and engaging said end wall thereby pivoting said sear in position to engage said sear notch upon said trigger bar being moved in a direction to cock said hammer, and upon the further movement of said trigger bar said sear spring becoming disengaged from said end wall and the other of said leg portions engaging said stop member and pivoting said sear to become disengaged from said sear notch and said hammer spring forcing said hammer to swing to its firing position and firing said revolver.

6. The structure as recited by claim 5 and an adjustable pin mounted on said hammer, a shoulder mounted on said trigger bar adjacent said adjustable pin, a cocking lever mounted on said frame, a hammer set secured to said cocking lever adjacent said hammer for engaging and pivoting said hammer upon the actuation of said cocking lever whereby said adjustable pin engages said shoulder on said trigger bar to maintain said hammer in its cocked position.

7. A firearm comprising a frame, a hammer pivotally mounted on said frame, a spring yieldingly urging said hammer to its neutral position, an adjustable pin mounted on said hammer, a stop member secured to said frame, a trigger bar slidably mounted adjacent said stop member, a shoulder mounted on said trigger bar adjacent said adjustable pin, a cocking lever mounted on said frame, a hammer set secured to said cocking lever adjacent said hammer for engaging said hammer upon the actuation of said cocking lever in one direction whereby said adjustable pin engages said shoulder on said trigger bar to maintain said hammer in its cocked position.

8. The structure as recited by claim 7 and a cylinder release means mounted on said frame adjacent said hammer set, a spring mounted on said hammer set urging said hammer set in contact relation with said cylinder release whereby upon the actuation of said cocking lever in another direction said cylinder release means becomes actuated.

9. The structure as recited by claim 7 wherein said adjustable pin comprises a threaded bolt mounted in a threaded bore contained by said hammer and a spring mounted in said threaded bore in contact relation with said threaded bolt.

References Cited in the file of this patent

UNITED STATES PATENTS

| | | |
|---|---|---|
| 743,784 | Wesson | Nov. 10, 1903 |
| 818,177 | Kolb et al. | Apr. 17, 1906 |
| 931,146 | Ringqvist | Aug. 17, 1909 |
| 968,691 | Ringqvist | Aug. 30, 1910 |
| 1,004,172 | Johnson | Sept. 26, 1911 |
| 1,007,709 | Leggett et al. | Nov. 7, 1911 |
| 1,399,224 | Ortgies | Dec. 6, 1921 |
| 1,518,831 | Wright | Dec. 9, 1924 |
| 2,324,674 | Buchanan | July 20, 1943 |
| 2,363,203 | Sherrer et al. | Nov. 21, 1944 |

OTHER REFERENCES

"Pistols and Revolvers," vol. I of "The N.R.A. Book of Small Arms," by Walter H. B. Smith. Copyright 1946 by The National Rifle Association, Washington, D.C., pages 612 and 626.